United States Patent
Rock

(10) Patent No.: US 8,701,993 B2
(45) Date of Patent: *Apr. 22, 2014

(54) WIRELESS DIAGNOSTIC SYSTEM AND METHOD

(71) Applicant: SST Systems, Inc., Sturgeon Bay, WI (US)

(72) Inventor: Robert G. Rock, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,845

(22) Filed: Feb. 13, 2013

(65) Prior Publication Data

US 2013/0192580 A1    Aug. 1, 2013

Related U.S. Application Data

(63) Continuation of application No. 13/173,191, filed on Jun. 30, 2011, now Pat. No. 8,376,230, which is a continuation of application No. 12/754,709, filed on Apr. 6, 2010, now Pat. No. 8,066,185, which is a continuation of application No. 11/449,388, filed on Jun. 8, 2006, now Pat. No. 7,712,662.

(51) Int. Cl.
*G06K 7/00* (2006.01)

(52) U.S. Cl.
USPC ............................................. 235/439

(58) Field of Classification Search
USPC .................... 235/376, 435, 439, 475
See application file for complete search history.

(56) References Cited

U.S. PATENT DOCUMENTS

| | | |
|---|---|---|
| 4,004,219 A | 1/1977 | Tiuri et al. |
| 4,340,796 A | 7/1982 | Yamaguchi et al. |
| 4,377,733 A | 3/1983 | Yamaguchi et al. |
| 4,447,805 A | 5/1984 | Omae et al. |
| 4,518,839 A | 5/1985 | Taguchi et al. |
| 4,590,466 A | 5/1986 | Wiklund et al. |
| 4,617,638 A | 10/1986 | Krause et al. |
| 4,942,956 A | 7/1990 | Acker et al. |
| 5,319,576 A | 6/1994 | Iannadrea |
| 5,378,874 A | 1/1995 | Holling et al. |
| 5,416,727 A | 5/1995 | Shook et al. |
| 5,426,428 A | 6/1995 | Binder et al. |
| 5,711,606 A | 1/1998 | Koetcher |
| 5,746,114 A | 5/1998 | Harris |
| 6,062,728 A | 5/2000 | Breunsbach et al. |

(Continued)

OTHER PUBLICATIONS

International Search Report and Written Opinion for PCT/US07/70737, dated Apr. 16, 2008, 9 pages.

(Continued)

*Primary Examiner* — Seung Lee
(74) *Attorney, Agent, or Firm* — Michael Best & Friedrich LLP

(57) ABSTRACT

A diagnostic system for an oven chamber, an oven system, and a method of wirelessly monitoring item temperature in an oven chamber are disclosed. In some embodiments, a temperature sensor used for sensing the temperature of an item is moved or transported with the item by a conveyor system. Also, in some embodiments, a wireless transmitter coupled to the temperature sensor can transmit a temperature signal to a receiver located outside of the oven chamber, and can also be moved or transported with the item. Data representative of item temperature can be stored, displayed, and/or used to modulate operation of the oven in some embodiments.

28 Claims, 3 Drawing Sheets

(56) References Cited

U.S. PATENT DOCUMENTS

| | | |
|---|---|---|
| 6,080,972 A | 6/2000 | May |
| 6,104,987 A | 8/2000 | Farnsworth |
| 6,375,351 B1 | 4/2002 | Breunsbach et al. |
| 6,520,675 B1 | 2/2003 | Breunsbach et al. |
| 6,539,842 B1 | 4/2003 | Chapman et al. |
| 6,720,195 B2 | 4/2004 | Jensen |
| 6,866,417 B2 | 3/2005 | Gunawardena et al. |
| 6,924,469 B1 | 8/2005 | Strong |
| 6,964,518 B1 | 11/2005 | Jagtoyen |
| 7,448,546 B2 | 11/2008 | Jung et al. |
| 7,480,976 B2 | 1/2009 | Reed et al. |

OTHER PUBLICATIONS

Internet Brochure entitled "Furnace Tracker Radio Telemetry System", DATAPAQ, Inc., Wilmington, MA, allegedly published Jul. 2004.

WIRELESS DIAGNOSTIC SYSTEM AND METHOD

CROSS-REFERENCE TO RELATED APPLICATIONS

This application is a continuation of U.S. patent application Ser. No. 12/754,709, filed Apr. 6, 2010, which is a continuation of U.S. patent application Ser. No. 11/449,388, filed Jun. 8, 2006, now U.S. Pat. No. 7,712,662, the entire contents of both of which are hereby incorporated by reference.

BACKGROUND

Numerous automated and semi-automated systems exist for treating parts of all types, shapes, and sizes, including without limitation parts used in automotive, household goods, machinery, and electronics industries. Such systems can be used to paint (e.g., liquid coating, powder coating, electrocoating, and the like), heat treat, dehydrate, clean, and perform a wide variety of other processes upon parts. As used herein, the term "treat" in its various forms refers to any of these processes.

Any of these systems can operate by conveying parts to locations within the system at which the parts are treated singularly or in batches. The systems can convey parts in any known manner, such as by conveying individual parts suspended upon hooks, brackets, wires, or other fixtures, or by conveying multiple parts in baskets, buckets, racks, pallets, and the like. The parts can be conveyed using any combination of chain, belt, cable, tabletop, bucket, and other conveyors, systems employing hydraulic or pneumatic pistons, slides, rails, vibration conveyors, and the like. As used herein, the term "conveyor" refers to any device or system adapted to move parts before, during, and/or after treatment.

In many cases, it is highly desirable to measure one or more parameters of a part or a part's environment before, during and/or after treatment of the part. For example, it may be desirable to measure the temperature of a part being exposed to heat for any purpose. In such cases, it may also be desirable to measure the temperatures of two or more locations of the part. As another example, it may be desirable to measure any other property (e.g., strain, chemical composition, weight, density, and the like) of a part. As yet another example, it may be desirable to measure one or more properties of the environment around the part, such as the temperature, fluid flow, humidity or pressure around the part, the acidity of the environment around the part, the presence and/or amount of one or more chemicals or substances in the environment around the part, and the like.

In all such cases, the ability to take accurate part or part environment measurements can be quite limited based upon a number of factors, such as the environment itself (e.g., an extremely hot, cold, caustic, toxic, or other environment) or movement of the part, treatment system, or conveyor system. Also, many treatment systems employ one or more partially or fully enclosed chambers that can render precise and accurate part or part environment measurements difficult.

SUMMARY

In some embodiments, a diagnostic system for an oven chamber within which an item is moved and heated is provided, and comprises a temperature sensor movable with the item in the oven chamber, the temperature sensor positioned to detect a temperature of the item at a first location of the item; a transmitter electrically coupled to the temperature sensor and also movable with the item in the oven chamber; a receiver located remotely from the oven chamber and configured to receive a wireless signal from the transmitter; and a controller coupled to the receiver and operable to record data indicative of the item temperature at the first location based at least in part upon the wireless signal received from the receiver.

Some embodiments of the present invention provide an oven system for heating an item, wherein the oven system comprises a chamber within which the item is heated; a conveyor movable to transport the item into, within, and out of the chamber; a temperature sensor coupled to and movable with the item, the temperature sensor positioned to detect a temperature of the item; a transmitter coupled to the temperature sensor and configured to transmit a wireless signal comprising data representative of the temperature of the item; and a receiver configured to receive the wireless signal.

In some embodiments, a method of wirelessly monitoring the temperature of an item in an oven chamber through which the item is conveyed is provided, and comprises transporting the item within the oven chamber; sensing a temperature of the item at a first location on the item; transmitting a wireless signal from within the oven chamber to a second location outside of the oven chamber, the wireless signal containing data representative of the temperature of the item at the first location on the item; and repeating the transporting, sensing, and transmitting steps at least once.

Other aspects of the invention will become apparent by consideration of the detailed description and accompanying drawings.

BRIEF DESCRIPTION OF THE DRAWINGS

The present invention is further described with reference to the accompanying drawings, which show an embodiment of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
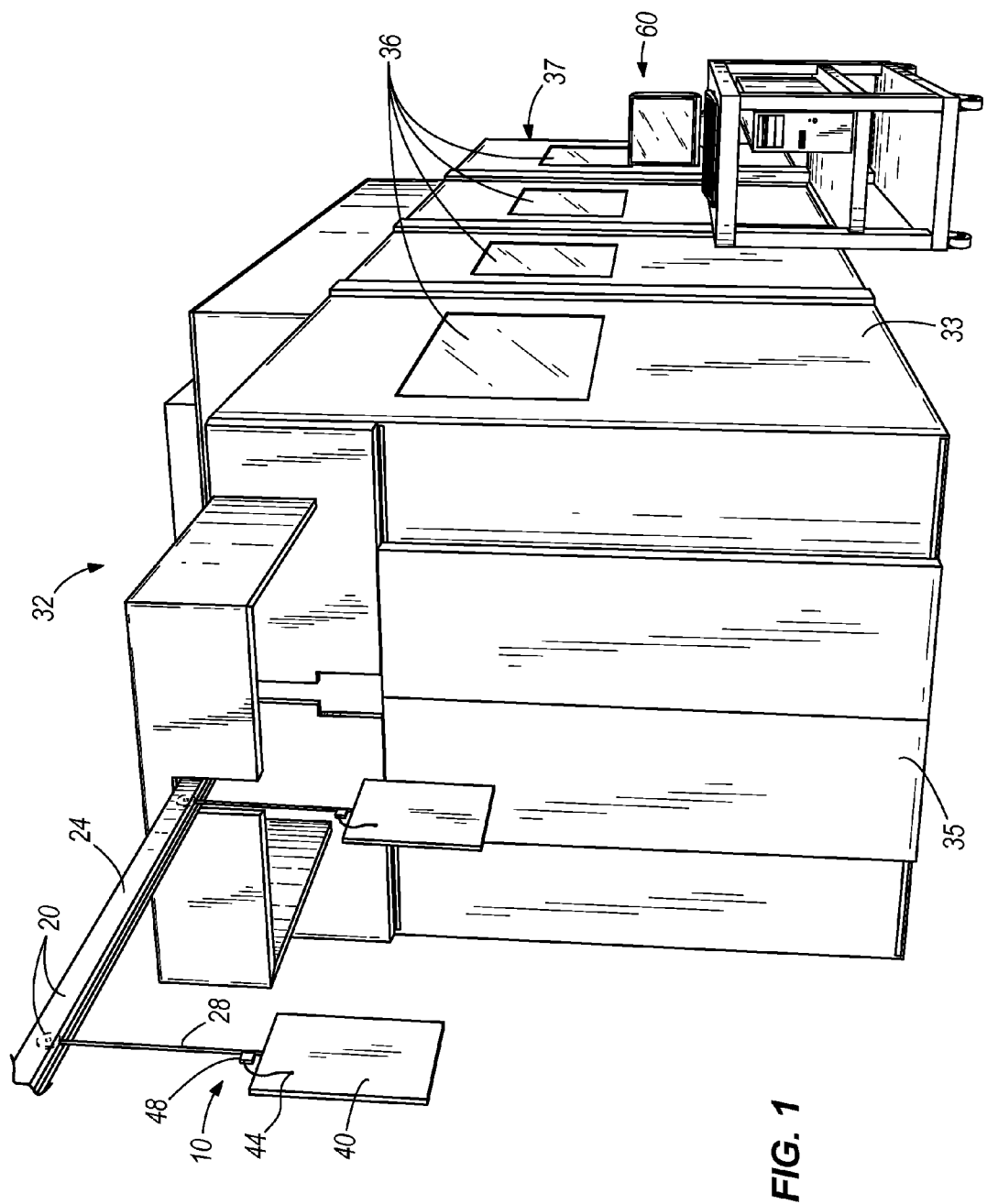
FIG. 1 is a perspective view of a conveyor system with a wireless diagnostic system according to an embodiment of the present invention.

A wireless diagnostic system according to an embodiment of the present invention is illustrated in FIG. 1, and is shown installed in a conveyor system 20. The conveyor system 20 includes a rail 24 defining a conveyance path and a support 28 transported along the rail 24. The conveyor system 20 can be or include any of the types of conveyors described above, and in the illustrated embodiment is a rail-based system along which supports 28 move. One or more items are suspended, contained, or otherwise supported on or in the supports 28. Such supports 28 can also be employed in conjunction with other types of conveyor systems 20 described earlier.

At a location along the conveyance path of the rail 24, a temperature-controlled station (e.g., an oven 32) is provided. The oven 32 is a substantially closed chamber in some embodiments, and can include any suitable device or system for opening and closing the chamber 33. For example, the oven 32 can be provided with an access door 35 movable in any conventional manner between open and closed positions. The oven 32 is provided with or is in communication with a heater (not shown) for heating the chamber 33 and items introduced therein. Any type of heater can be employed depending at least partially upon the type of item treatment desired. For example, the heater can comprise one or more gas, oil, propane, or other fuel-burning heaters, electric (e.g., infrared) or other radiant heating elements, microwave heaters, steam or forced air heaters in which fluid is heated utilizing any of these types of heaters, and the like. As used herein, the term "heater" refers to any of such heaters, whether alone or in any combination.

With continued reference to the illustrated embodiment of FIG. 1, the support 28 is transported along the rail 24 (e.g., by one or more belts, cables, chains, gear systems, hydraulic or pneumatic actuators, and the like) such that an item 40 attached to the support 28 is transported into and out of the oven 32, being exposed to heat from the heater while inside the oven 32. The support 28 can be moved in discrete steps or increments, or alternatively, can be conveyed in a continuous fashion.

In the illustrated embodiment of FIG. 1, the conveyor system 20 extends through the chamber 33. In operation, supports 28 (with any items thereon) enter the chamber 33 through a first door or opening 35, and exit the chamber 33 through a second door or opening 37. In other embodiments, supports 28 and items enter and exit the chamber 33 through the same door or opening, such as in applications where a rail 24 extends into and out of a common side of the oven 32, and in applications where supports 28 and items are transported into the chamber 33 in a first direction along the conveyor system 20, are treated, and then exit the chamber 33 in a reverse direction along the conveyor system 20.

In the illustrated embodiment of FIG. 1, the conveyor system 20 is oriented to move items 40 through the oven 32 along a substantially horizontal path. In other embodiments, this path can have any orientation or combination of orientations desired, depending in many cases upon the position and orientation of the conveyor system 20. By way of example, in some embodiments, at least a portion of the conveyor system 20 can include a vertically-oriented path for the supports 28, such as in cases where items 40 are dipped in one or more tanks for treatment (e.g., cleaning, coating, and the like). In such cases, the supports 28 and items 40 can travel through one or more doors in a top of the oven 32. As another example, at least a portion of the conveyor system 20 can move diagonally to change the elevation of supports 28 and items 40 moving through the oven 32. As yet another example, the conveyor system 20 can be shaped to move supports 28 and items 40 through one or more turns before entering, within, and/or after exiting the oven 32, such as when supports 28 and items 40 move through doors on adjacent walls of an oven 32. Still other conveyor orientations and shapes are possible, and fall within the spirit and scope of the present invention.

In many applications, it may be required or preferred to have multiple chambers 33 positioned along the conveyor system 20. The chambers may be additional ovens 32 of the same or varied type or may alternately contain components that treat or process the items 40 in other ways.

The item 40 transported by the conveyor system 20 is a coated metal article to be cured in a coating process by heat within the oven chamber 33. However, the item 40 can instead comprise any other material or combination of materials, limited only to the suitability of such materials for withstanding the oven environment. Also, the heat treatment process described in connection with the oven 32 illustrated in FIG. 1 is described herein by way of example only. The oven 32 can be adapted to heat items 40 for any other purpose, such as for heat treatment, aging, potting, baking, dehydration, and the like.

With continued reference to FIG. 1, the wireless diagnostic system (indicated generally at 10) comprises a first temperature sensor 44 located in a first location on the item 40. The invention can be adapted to work with any type of temperature sensor 44 depending at least in part upon the oven environment. By way of example only, the temperature sensor 44 can be a thermocouple, resistor sensor, thermistor, semiconductor sensor, and the like.

The temperature sensor 44 illustrated in FIG. 1 is coupled to a wireless transmitter 48, which is transported along with the item 40. The transmitter 48 can be attached to the support 28 and/or the item 40 in a direct or indirect mounting, as discussed in greater detail below. The transmitter 48 is electrically coupled to the temperature sensor 44 via a wire or cable in the illustrated embodiment. Alternatively, the temperature sensor 44 and transmitter 48 can be directly coupled together, such as by sharing a common circuit board, mount, and/or housing. The transmitter 48 is operable to receive one or more signals from the temperature sensor 44 indicative of the temperature of the item 40 at the first location and subsequently emit a wireless signal to a receiver 56 (see FIG. 2A). The receiver 56 can then relay data to a controller 60 (such as a computer with internal memory).

In some embodiments, the chamber 33 includes one or more windows 36 of a material permeable to the wireless signal to facilitate transmission of the wireless signal out of the chamber 33. The windows 36 can be in any desired locations of the oven 32, such as in one or more walls of the oven 32, in a floor or roof of the oven 32, and the like. In some embodiments, the locations of the windows 36 are dependent at least in part upon the location(s) of the receiver(s) 56 receiving signals transmitted by the transmitter 48 (e.g., providing little or no obstruction to transmission of such signals through the windows 36 to the receiver 46). It should be noted that the term "window" (as used herein and in the appended claims) does not necessarily mean that the window 36 must be transparent or translucent for a viewer. Instead, the term "window" refers only to structure permitting wireless transmission of signals from within the oven 32 to one or more locations outside of the oven 32.

The temperature sensor 44 and/or transmitter 48 can be electrically coupled to a battery or other power supply as will be described in greater detail below. Also, in some embodiments a processor or other electronics can be connected to the temperature sensor 44 and/or transmitter 48 in order to process the signal(s) received from the temperature sensor 44, such as to amplify, filter, or modify the signal(s) in any desired manner prior to transmission. By way of example only, an electrical signal received from the temperature sensor 44 can be processed by converting the electrical signal (provided as a current or voltage, for example) to a value of temperature on a predetermined unit scale (e.g. Kelvin, Celsius, Fahrenheit, etc.).

Figure 2A:
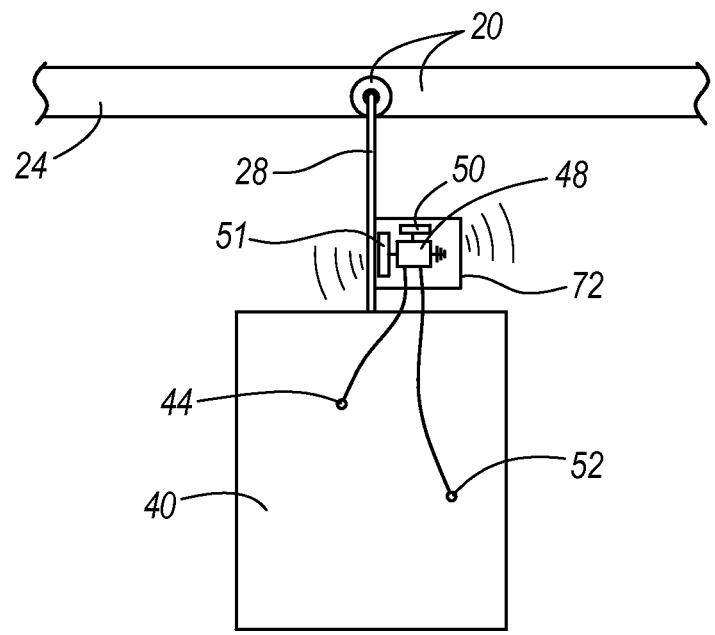
FIG. 2A is a schematic view of a wireless diagnostic system according to an embodiment of the present invention.
Figure 2A:
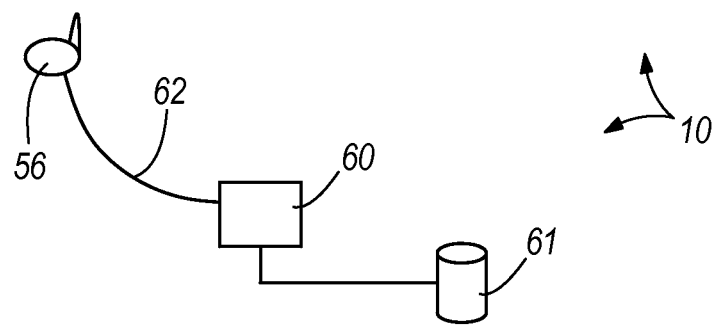

The wireless diagnostic system 10 illustrated in FIG. 2A also has a second temperature sensor 52 at a second location on the item 40 spaced from the first location. The second temperature sensor 52 can be the same or different from the first temperature sensor 44, and in some embodiments is configured to operate in substantially the same manner as the first temperature sensor 44 in order to sense a temperature of the item 40 at the second location.

Although the wireless diagnostic system 10 illustrated in FIG. 2A has two temperature sensors 44 and 52, the wireless diagnostic system 10 in other embodiments can have any other number of temperature sensors 44 and 52 desired for measuring the temperature of any number of locations of an item 40. Also or alternatively, the wireless diagnostic system 10 can have two or more temperature sensors 44 and 52 for measuring the temperatures of two or more items 40.

The transmitter 48 receives signals from the first 44 and second 52 temperature sensors, and transmits wireless signals corresponding to the received signals. In practice, the transmitter 48 may transmit a single signal containing data related to the temperatures sensed by the sensors 44 and 52 to which the transmitter 48 is coupled. As described above, in some embodiments the transmitter 48 can be provided with a processor or other electronics to process the signals received from the temperature sensors 44 and 52 before transmitting signals. Such a processor or other electronics can be part of the transmitter and/or temperature sensor electronics, or can be separate from the transmitter and/or temperature sensor electronics. In other embodiments, signal processing occurs only by downstream equipment (described in greater detail below) rather than prior to transmission. Alternatively, signal processing can occur both before and after signal transmission by the transmitter 48.

In some embodiments, the transmitter 48 is configured to transmit wireless signals at predetermined time intervals. Alternatively or in addition, the transmitter 48 can transmit such signals at predetermined points in time (e.g., at particular times during the treatment process within the oven 32), or can transmit such signals constantly. In still other embodiments, the transmitter is coupled to a memory in which signals to be transmitted can be stored for transmission in batch form. Such a memory (not shown) can also be utilized as a backup feature to protect against the loss of data transmitted yet not received downstream in the wireless diagnostic system 10 (e.g. due to environmental noise, obstructions to signal transmission, and the like).

In some embodiments, the transmitter 48 is a radio frequency (RF) transmitter configured to emit RF signals. However, the transmitter 48 can be any other type of wireless transmitter desired.

The wireless diagnostic system 10 illustrated in FIG. 2A further comprises a receiver 56 positioned outside the oven chamber 33 for receiving wireless signals transmitted from the transmitter 48. The receiver 56 can be electrically coupled to a processor 60 (e.g., of a computer terminal) and/or to a network, data storage device 61, or a printer, display, or other peripheral device. In this regard, the receiver 56 can be connected to a local or wide area network and/or to the Internet in order to send the received signal information to one or more desired destinations.

With continued reference to FIG. 2A, the receiver 56 and the processor 60 are coupled via a data-sharing cable 62. Electrical signals indicative of temperatures sensed by the first and second temperature sensors 44 and 52 on the item 40 are thereby received by the processor 60 for display, recordation in the connected data storage device 61, and/or instrument control. In those embodiments having a display, data representative of the temperatures sensed by the first and second temperature sensors 44 and 52 can be displayed in any manner desired, such as in real or non-real time, in graphical and/or text format, and the like.

In some embodiments, the processor 60 can be configured to compare the temperature data received from the transmitter 48 to one or more thresholds, desired temperature ranges or setpoints, or other operation parameters. In such embodiments, the processor 60 can also be configured to automatically control operation of the oven 32 and/or conveyor system 20 (e.g., to slow, speed up, or stop the conveyor system 20, to increase or decrease the temperature of the oven 32, and the like), or to alert a user of oven operation or an out-of-spec operational parameter. For example, in some embodiments, the processor 60 includes a software program or electronics configured to output control signals to the heater for modulating the intensity or duration of heat provided by the heater. As another example, such a software program or electronics can be configured to output control signals to the conveyor system 20 for changing the speed or manner in which items 40 are moved within the oven 32. The wireless diagnostic system 10 can be incorporated into or communicate with such a program or electronics for control of the heater and/or transport system 20 with control signals sent from the processor 60. Further opportunities for utilizing the sensed temperature as a control parameter are possible, and fall within the spirit and scope of the present invention.

With continued reference to FIG. 2A, the transmitter 48 is electrically coupled to the two temperature sensors 44, 52 and to a power supply 50 (e.g., a battery, in some embodiments) and signal processor 51. The signal processor 51 can take any form suitable for processing signals to be transmitted by the transmitter 48, including without limitation processor-based electronics, analog circuitry, and the like. In other embodiments, more or fewer temperature sensors 44 and 52 can be utilized. Also in other embodiments, no signal processor 51 is associated with the transmitter 48.

A thermally protective enclosure 72 substantially surrounds the transmitter 48 to insulate the transmitter 48 from potentially harmful temperatures (and/or other harsh environmental conditions, in those cases where the wireless diagnostic system 10 is utilized in other types of treatment systems). The enclosure 72 can be permeable to the wireless signal transmitted from the transmitter 48 such that the wireless signal can be picked up by the remotely located receiver 56. It should be noted that such a thermally protective enclosure 72 can be utilized to protect any transmitter(s) 48 in any of the embodiments disclosed herein, including the embodiment illustrated in FIG. 2A.

The thermally protective enclosure 72 can be provided with a device for coupling the transmitter 48 to the item 40, support 28, and/or conveyor system 20. By this connection, the transmitter 48 can move with the item 40 as the item 40 is transported into, within, and/or out of the oven chamber 33. This ability enables the connected temperature sensors 44 and 52 to detect temperatures of the item 40 at different locations in the oven chamber 33, and in some embodiments even while the item 40 (and transmitter 48 and temperature sensors 44 and 52) is moving. Such a connection device can be utilized to couple the transmitter to the item 40, support 28, and/or conveyor system 20 regardless of whether the transmitter 48 is provided with a thermally protective enclosure 72, and regardless of the shape and size of any housing or package in which the transmitter 48 (and power supply 50 and/or signal processor 51, in some embodiments) is located. In this regard, the device used to couple the transmitter 48 to the item 40, support 28, and/or conveyor system 20 can do so directly, such as by directly mounting the transmitter to a surface.

The device used to directly or indirectly couple the transmitter 48 to the item 40, support 28, and/or conveyor system 20 can take a number of different forms, including without limitation clips, clamps, brackets, fasteners (e.g., screws, bolts, rivets, pins, hooks, magnets, and the like), straps, wire, inter-engaging elements, and the like.

Figure 2B:
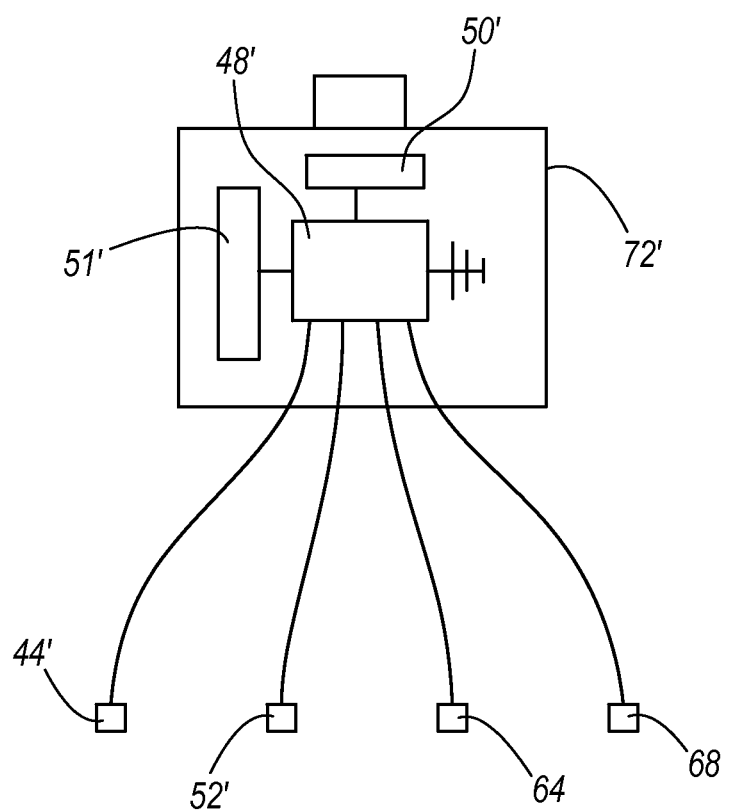
FIG. 2B is a schematic view of a wireless diagnostic system according to another embodiment of the present invention.

In the illustrated embodiment of FIG. 2B, the transmitter 48 is electrically coupled to four sensors 44', 52', 64, and 68, and to a power supply 50' (e.g., a battery, in some embodiments) and signal processor 51'. The sensors 44', 52' can be temperature sensors operationally similar to those described above. The sensors 64 and 68 can be additional temperature sensors added to provided additional locations of temperature monitoring. Alternately, the sensors 64 and 68 can be configured to sense various properties of the item or its ambient surroundings. Exemplary properties that can be sensed include, but are not limited to, humidity, global or relative position, fluid flow rate, fluid conductivity, and incident vibration. The power supply 50' and signal processor 51' are provided to function in a manner similar to that described above. A thermally protective enclosure 72' substantially surrounds the transmitter 48', the power supply 50', and the signal processor 51' to shield the items from damaging atmospheric conditions within the oven chamber 33.

While the invention has been described herein in relation to a transport system 20 for moving an item 40 along a conveyance path, a wireless diagnostic system 10 adapted for stationary use, but provided as otherwise described and illustrated herein is considered within the scope of the invention. By the same token, the wireless diagnostic system 10 can be used to measure ambient temperatures near the item 40 in other embodiments. In still other embodiments, a multi-sensor diagnostic system 10 is capable of sensing and transmitting temperatures of both the item 40 and its surroundings, and falls within the spirit and scope of the present invention.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

For example, the wireless diagnostic system 10 can be used in conjunction with a number of other treatment systems or combinations of treatment systems, including without limitation chillers, refrigerators, or freezers, chemical treatment systems, cleaning systems, assembly lines, and the like. Also, the wireless diagnostic system 10 can be used in treatment systems having multiple treatment stages and/or chambers 33 along which items to be treated are moved by one or more conveyor systems 20. By way of example only, the wireless diagnostic system 10 can be used in a treatment system having a cleaning chamber (e.g., dip tank, spray system, and the like), drying chamber, and oven chamber, wherein sensor(s) 44, 52, 44', 52', 64, 68 are adapted to sense one or more parameters of items 40 at one or more stages in the treatment system. Other treatment systems having any number of different stages for treatment of items 40 are possible, and fall within the spirit and scope of the present invention.

Items 40 to be treated in any of the treatment systems disclosed herein can be exposed to air, gasses, liquids, or environments in which any combination of these media exist. The enclosure 72 described above can be constructed to be water and/or gas resistant, water and/or gas proof, chemical resistant, shock resistant (impact and/or thermal), and/or can be adapted to protect the transmitter 48 and other components of the wireless diagnostic system 10 attached to the sensor(s) 44, 52, 44', 52', 64, 68 in any other suitable manner based at least in part upon the environment(s) within the chamber 33.

What is claimed is:

1. A diagnostic system for a treatment system in which an item is subjected to a treatment process within a treatment area, the diagnostic system comprising:
    a sensor configured to detect a property of the item, the sensor movable with the item relative to the treatment area;
    an enclosure movable with the item relative to the treatment area, the enclosure being at least one of gas proof and water proof;
    a transmitter electrically coupled to the sensor and located within the enclosure, the transmitter being configured to transmit a wireless signal through the enclosure;
    a receiver located remotely from the treatment area and configured to receive the wireless signal from the transmitter; and
    a controller coupled to the receiver and operable to generate at least one of display and recordation of data indicative of the item property based at least in part upon the wireless signal received from the receiver.

2. The diagnostic system of claim 1, wherein the sensor is one of a plurality of sensors configured to detect one or more properties of the item at a plurality of locations on the item, the plurality of sensors electrically coupled to the transmitter.

3. The diagnostic system of claim 1, further comprising a signal processor positioned in the enclosure and electrically coupled with the sensor and the transmitter, the signal processor configured to convert an electrical signal received from the sensor and to send the converted electrical signal to the transmitter.

4. The diagnostic system of claim 1, wherein the sensor and the item are movable by a conveyor to different locations within the treatment area.

5. The diagnostic system of claim 4, wherein the enclosure is coupled to the conveyor.

6. The diagnostic system of claim 4, wherein the controller is adapted to modulate the speed of the conveyor in response to the data indicative of the item property.

7. The diagnostic system of claim 1, wherein the controller is adapted to modulate at least one parameter of the treatment process of the item in response to the data indicative of the item property.

8. The diagnostic system of claim 7, wherein the property detected by the sensor is temperature, and the diagnostic system further comprises a heater coupled to the controller, wherein the at least one parameter of the treatment process adapted to be modulated by the controller is an amount of heat output from the heater.

9. The diagnostic system of claim 1, further comprising a memory in which data of the item property detected by the sensor over a period of time is stored.

10. The diagnostic system of claim 9, wherein the memory is configured to store a plurality of signals, and the transmitter is configured to transmit the plurality signals in batch form.

11. The diagnostic system of claim 1, wherein the wireless signal is an RF signal.

12. The diagnostic system of claim 1, wherein the item property detected by the sensor is any one of temperature, strain, chemical composition, weight and density.

13. The diagnostic system of claim 1, wherein the transmitter is configured to transmit a wireless signal at predetermined time intervals.

14. The diagnostic system of claim 1, wherein the transmitter is configured to transmit wireless signals at predetermined points in time corresponding to particular times during the treatment process.

15. A treatment system for carrying out a treatment process on an item, comprising:
 a treatment area defining an environment within which the item is treated;
 a sensor configured to detect a property of the environment, the sensor movable with the item relative to the treatment area;
 an enclosure, the enclosure being at least one of gas proof and water proof;
 a transmitter coupled to the sensor and located within the enclosure, the transmitter being configured to transmit a wireless signal comprising data representative of the property of the environment; and
 a receiver located remotely from the treatment area and configured to receive the wireless signal.

16. The treatment system of claim 15, further comprising a conveyor movable to transport the item relative to the treatment area, wherein the enclosure is coupled to the conveyor.

17. The treatment system of claim 15, further comprising:
 a controller coupled to the receiver; and
 a memory coupled to the controller and within which data representative of the property of the environment over time is stored.

18. The diagnostic system of claim 17, wherein the memory is configured to store a plurality of signals, and the transmitter is configured to transmit the plurality of signals in batch form.

19. The treatment system of claim 15, wherein the property detected is one of temperature, fluid flow, humidity, pressure, acidity, presence of a chemical substance, and amount of a chemical substance.

20. The treatment system of claim 15, wherein the sensor is one of a plurality of sensors electrically coupled to the transmitter and configured to detect the parameter of the environment at a corresponding plurality of locations.

21. The treatment system of claim 15, wherein the sensor is one of a plurality of sensors electrically coupled to the transmitter and configured to detect a plurality of parameters of the environment.

22. The treatment system of claim 15, further comprising a controller coupled to the receiver and configured to control at least one aspect of operation of the treatment system responsive to the wireless signal.

23. The treatment system of claim 22, further comprising a conveyor movable to transport the item relative to the treatment area, wherein the controller is configured to automatically control a rate at which the item is transported by the conveyor.

24. The treatment system of claim 22, wherein the controller is configured to automatically control a parameter of the environment corresponding to the detected parameter.

25. The treatment system of claim 15, wherein the wireless signal is an RF signal.

26. The treatment system of claim 15, wherein the transmitter is configured to transmit a wireless signal at predetermined time intervals.

27. The treatment system of claim 15, wherein the transmitter is configured to transmit wireless signals at predetermined points in time corresponding to particular times during the treatment process.

28. A treatment system for carrying out a treatment process on an item, comprising:
 a treatment area defining an environment within which the item is treated;
 a conveyor movable to transport the item relative to the treatment area;
 a sensor configured to detect a property of one of the item and the environment;
 an enclosure movable with the item by the conveyor, the enclosure being at least one of gas proof and water proof;
 a transmitter coupled to the sensor and located within the enclosure, the transmitter being configured to transmit a wireless signal comprising data representative of the detected property;
 a receiver configured to receive the wireless signal at a location remote from the treatment area; and
 a controller coupled to the receiver and operable to automatically control at least one parameter of the treatment process in response to the wireless signal.

* * * * *